(12) United States Patent
Kawamoto et al.

(10) Patent No.: US 8,544,108 B2
(45) Date of Patent: Sep. 24, 2013

(54) COPYRIGHT PROTECTION STORAGE MEDIUM, INFORMATION RECORDING APPARATUS AND INFORMATION RECORDING METHOD, AND INFORMATION PLAYBACK APPARATUS AND INFORMATION PLAYBACK METHOD

(75) Inventors: Yoji Kawamoto, Tokyo (JP); Norifumi Goto, Tokyo (JP); Ryuji Ishiguro, Tokyo (JP)

(73) Assignee: Sony Corporation, Tokyo (JP)

( * ) Notice: Subject to any disclaimer, the term of this patent is extended or adjusted under 35 U.S.C. 154(b) by 1400 days.

(21) Appl. No.: 11/769,193

(22) Filed: Jun. 27, 2007

(65) Prior Publication Data

US 2008/0289050 A1    Nov. 20, 2008

(30) Foreign Application Priority Data

Jul. 3, 2006    (JP) ................................. 2006-183707

(51) Int. Cl.
*H04L 29/06* (2006.01)

(52) U.S. Cl.
USPC ................... 726/28; 726/26; 726/27; 726/29; 726/30; 705/51; 705/52; 705/53; 705/54; 705/59

(58) Field of Classification Search
USPC ........................................................ 705/59
See application file for complete search history.

(56) References Cited

U.S. PATENT DOCUMENTS

| | | | |
|---|---|---|---|
| 2005/0004875 A1* | 1/2005 | Kontio et al. | 705/52 |
| 2005/0091507 A1* | 4/2005 | Lee et al. | 713/182 |
| 2006/0150257 A1* | 7/2006 | Leung et al. | 726/27 |
| 2006/0153378 A1* | 7/2006 | Lotspiech et al. | 380/201 |
| 2006/0190621 A1* | 8/2006 | Kamperman et al. | 709/245 |
| 2006/0200415 A1* | 9/2006 | Lu | 705/50 |
| 2009/0235330 A1* | 9/2009 | Byun et al. | 726/4 |

FOREIGN PATENT DOCUMENTS

| | | |
|---|---|---|
| JP | 2002-099514 | 4/2002 |
| JP | 2002-359616 | 12/2002 |
| JP | 2004-139433 | 5/2004 |
| WO | WO 2006/003778 | 1/2006 |

OTHER PUBLICATIONS

Koster et al., "Identity-Based DRM: Personal Entertainment Domain", 2006, pp. 104-122.*

* cited by examiner

*Primary Examiner* — Taghi Arani
*Assistant Examiner* — Thaddeus Plecha
(74) *Attorney, Agent, or Firm* — Finnegan, Henderson, Farabow, Garrett & Dunner, L.L.P.

(57) ABSTRACT

To provide a copyright protection storage medium in which copyright protected contents are recorded by an information recording apparatus connected to a content server providing copyright protected contents and a license server handling licenses concerning recording/playback of the copyright protected contents through a network, in which the copyright protected contents are written by a simple copy-and-paste when the information recording apparatus is possessed by a prescribed user, and the copyright protected contents are written by combining a domain model which assures playback in the apparatus and a media-bind model when the information recording apparatus is possessed by another user.

20 Claims, 11 Drawing Sheets

| UsageRule |
| Enc (KuserA, Kc) |

| LICENSE ID |
| CREATION DATE |
| EXPIRATION DATE |
| USAGE RULES |
| MEDIA UNIQUE ID |
| ELECTRONIC SIGNATURE |

LICENSE

| USER ID | CREDIT CARD NUMBERS | USER KEY | DEVICE ID | DEVICE KEY |
|---------|---------------------|----------|-----------|------------|
| USER A  | XXX-XXXX            | USER KEY A | DEVICE ID 1 | DEVICE KEY 1 |
|         |                     |          | DEVICE ID 2 | DEVICE KEY 2 |
|         |                     |          | DEVICE ID 3 | DEVICE KEY 3 |
|         |                     |          | DEVICE ID 4 | DEVICE KEY 4 |
| USER B  | XXX-XXXX            | USER KEY B | DEVICE ID 5 | DEVICE KEY 5 |
|         |                     |          | DEVICE ID 6 | DEVICE KEY 6 |
|         |                     |          | DEVICE ID 7 | DEVICE KEY 7 |
| ...     | ...                 | ...      | ...       | ...        |

| USER | USER KEY | DEVICE KEY |
|---|---|---|
| USER A | KusrA | Kdev1 |
| | | Kdev2 |
| | | Kdev3 |
| | | --- |
| USER B | KusrB | Kdev4 |
| | | Kdev5 |
| | | --- |

(Column labels: 3121, 3123, 3125)

COPYRIGHT PROTECTION STORAGE MEDIUM, INFORMATION RECORDING APPARATUS AND INFORMATION RECORDING METHOD, AND INFORMATION PLAYBACK APPARATUS AND INFORMATION PLAYBACK METHOD

CROSS REFERENCE TO RELATED APPLICATIONS

The present invention contains subject matter related to Japanese Patent Application JP 2006-183707 filed in the Japanese Patent Office on Jul. 3, 2006, the entire contents of which being incorporated herein by reference.

BACKGROUND OF THE INVENTION

1. Field of the Invention

The invention relates to a copyright, protection storage medium having a function of protecting copyright of contents at the time of recording and playing back contents, an information recording apparatus and an information recording method performing writing copyright protected contents to the copyright protection storage medium, and an information playback apparatus and an information playback method playing back copyright protected contents from the copyright protection storage medium.

2. Description of the Related Art

A service of selling digital contents such as music, movies and the like through networks such as Internet becomes widespread. For example, by using a music distribution service (Electronic Music Distribution: EMD) utilising Internet, it is possible that digital music contents are downloaded and stored in a personal computer which is a client terminal and played back on the personal computer.

At this time, on the side of the personal computer, a secure service is realized by activating a music recording/playback application adopting a prescribed copyright protection technology based on an OS, and storing content files including encrypted digital contents and right files in which usage rules corresponding to the contents are written in a HDD ana the like.

In JP-A-14-359616 (Patent Document 1) by the same assignee hereof, an information processing apparatus and the like is disclosed, which positively prevents unauthorised use without interfering distribution of contents by activating the music recording/playback application adopting a prescribed copyright protection technology.

SUMMARY OF THE INVENTION

In the past, it was difficult to play back user-bind contents by devices possessed by others. It was also difficult to make backup copies and the like of media-bind contents because they were bound by media. In addition, since a secure protocol is necessary every time contents are transferred, processing is slow.

Thus, it is desirable to provide a copyright protection storage medium, an information recording apparatus and an information recording method, and an information playback apparatus and an information playback method capable of playing back contents by devices possessed by others even if contents are user-bind contents, and capable of making backup copies of media-bind contents.

According to an embodiment of the invention, there is provided a copyright protection storage medium in which copyright protected contents are recorded by an information recording apparatus connected to a content server providing copyright protected contents and a license server handling licenses concerning recording/playback of copyright protected contents through a network, in which the copyright protected contents are written by a simple copy-and-paste when the information recording apparatus is possessed by a prescribed user, and the copyright protected contents are written by combining a domain model which assures playback in the apparatus and a media-bind model when the information recording apparatus is possessed by another user.

According to an embodiment of the invention, there is provided an information recording apparatus connected to a content server providing copyright protected contents and a license server handling licenses concerning recording/playback of copyright protected contents through a network, receiving and recording the copyright protected contents, which includes a writing means for writing the copyright protected contents in a copyright protection storage medium, in which the writing means writes the copyright protected content in the copyright protection storage medium by a simple copy-and-paste when the information recording apparatus is possessed by a prescribed user, and the writing means writes the copyright protected contents in the copyright protection storage medium by combining a domain model which assures playback in the apparatus and a media-bind model when the information recording apparatus is possessed by another user.

According to an embodiment of the invention, there is provided an information recording method executed by an information recording apparatus connected to a content server providing copyright protected contents and a license server handling licenses concerning recording/playback of copyright protected contents through a network, receiving and recording the copyright protected contents, which includes a step of writing the copyright protected contents in a copyright protection storage medium, in which, in the step of writing, the copyright protected contents are written in the copyright protection storage medium by a simple copy-and-paste when the information recording apparatus is possessed by a prescribed user, and the copyright protected contents are written in the copyright protect ion storage medium by combining a domain model which assures playback in the apparatus and a media-bind model when the information recording apparatus is possessed by another user.

According to an embodiment of the invention, there is provided an information playback apparatus playing back copyright protected contents recorded in a copyright protection storage medium, which includes a playback means for playing back the copyright protected contents from the copyright protection storage medium, in which the playback means plays back the copyright protected contents written in the copyright protection storage medium by a simple copy-and-paste when the information playback apparatus is possessed by a prescribed user, and the playback means plays back the copyright protected contents written in the copyright protection storage medium by combining a domain model and the media-bind model when the information playback apparatus is possessed by another user.

According to an embodiment of the invention, there is provided an information playback method executed by an information playback apparatus playing back copyright protected contents recorded in a copyright protection storage medium, which includes a step of playing back the copyright protected contents from the copyright protection storage medium, in which, in the step of playing back, the copyright protected contents written in the copyright protection storage medium are played back by a simple copy-and-paste when the information playback apparatus is possessed by a prescribed user, and the copyright protected contents written in the copyright protection storage medium are played back by combining a domain model and the media-bind model when the information playback apparatus is possessed by another user.

Accordingly, the invention relates to writing and playback of copyright protected contents in the storage medium with a copyright protection function, supporting both user bind and media bind. Specifically, a unique ID for identifying individuals is set to the copyright protection storage medium, and a user key using the unique ID is encrypted. The user key encrypts a content key.

At the time of playback, when a copyright protected content is played back from the copyright, protection storage medium, a unique ID is definitely acquired and the user key is decrypted from the ID. This is for assuring that playback is securely performed even when the device (information playback apparatus) is possessed by others. In the case of terminals possessed by the same user, they have the same user key, therefore, the content key can be directly decrypted.

Ciphers of the user key using the unique ID written in the copyright protection storage medium are processed, securely at the license server or at an information recording apparatus.

According to an embodiment of the invention, even in user-bind copyright protected contents, playback in the information playback apparatus possessed by others is enabled, and backup of media-bind copyright protected contents is enabled. In addition, processing at the time of transferring copyright protected contents can be reduced.

BRIEF DESCRIPTION OF THE DRAWINGS

FIG. 8 is a chart showing user information stored in a user information storage unit;

FIG. 9 is a chart showing data managed according to users in the case of a user-bind model;

DESCRIPTION OF THE PREFERRED EMBODIMENTS

Hereinafter, an embodiment of the invention will be explained with reference to the drawings.

Figure 1:
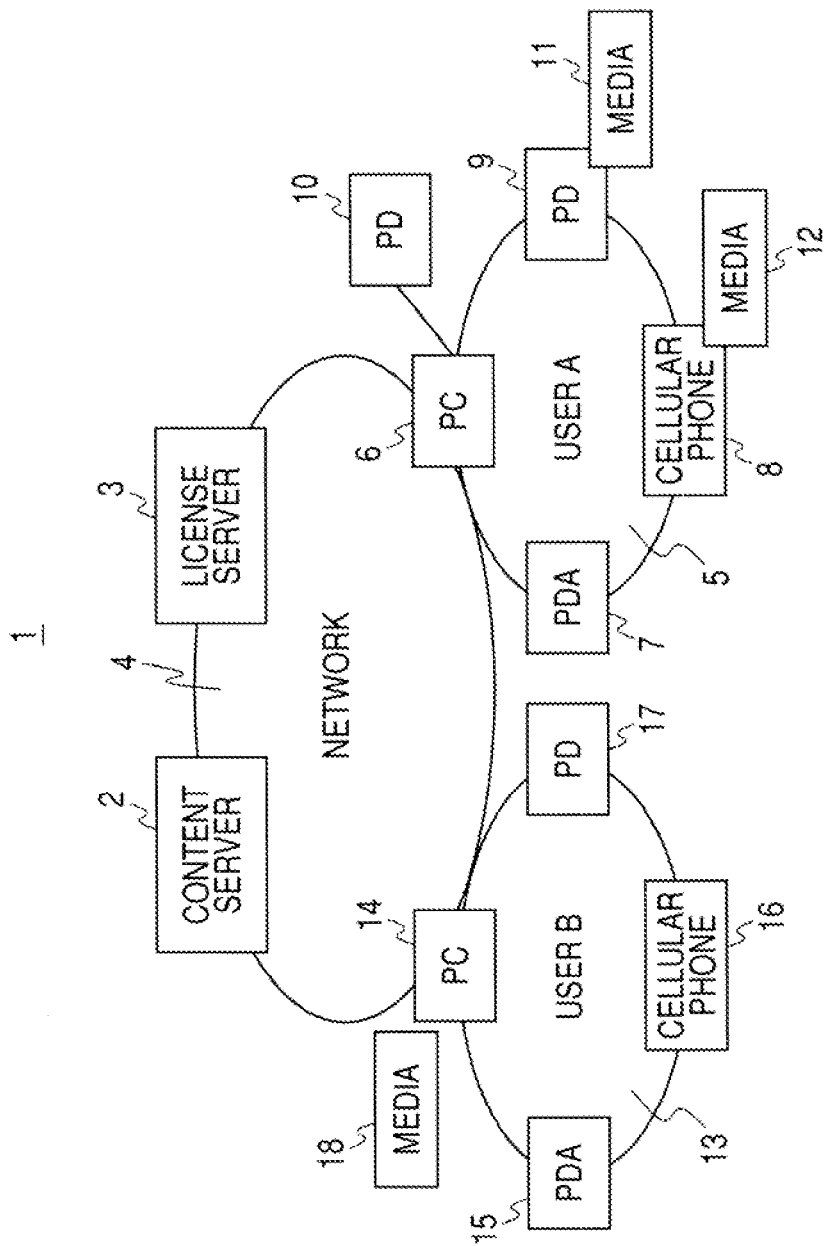
FIG. 1 is a whole configuration diagram of a content providing system.

FIG. 1 is a whole configuration diagram of a content providing system including plural user devices as specific examples of an information recording apparatus and an information playback apparatus according to the embodiment. As shown in FIG. 1, a content providing system 1 connects a user terminal group 5 grouped by a user A, a user terminal group 13 grouped by a user B, a content providing server (hereinafter, referred to as a content server) 2, and a copyright, management server (hereinafter, referred to as a license server) 3 to a network 4 such as Internet. In FIG. 1, the content server 2 and the license server 3 are shown as servers having different configurations, however, it is also preferable that they are united as one server.

In the user terminal group 5 grouped by the user A, user devices can be exemplified by a note-type or desktop-type personal computer (PC) 6, a portable information terminal device (personal Digital Assistant: PDA) 7, a cellular phone 8, a portable device (PD) 9 which is a portable content playback device and the like. The user terminal group 5 of the user A also includes a PD 10 connected to the PC 6 by an USB. The PDA 7, the cellular phone 8, and the PD 9 can be also connected to the PC 6 using I/F such as the USB and IEEE. The PD 9 can connect a semiconductor memory, a hard disk and the like as removable media 11 having a copyright protection function. The removable media 11 can be connected to the PC 6 as a matter of course, and the PC 6 and PD 9 can exchange data with each other by the removal media 11. Similarly, the cellular phone 8 can also connect semiconductor memories as removable media 12. The cellular phone 8 can also exchange data with the PC 6 using the removable media 12.

The removable media 11, 12 and the like with the copyright protection function have the function of protecting copyright of contents at the time of recording and playback, of the contents. An embodiment of the invention is a copyright protection storage medium in which copyright protection contents are recorded by the information recording apparatus (user device) in the information providing system 1, in which the copyright protection contents are written by a simple copy-and-paste when the user device is possessed by a prescribed, user, and the copyright protection contents are written by combining a domain model which assures playback in the apparatus and a media-bind model when the user device is possessed by another user. The prescribed user is the user A and another user is, for example, the latter user B. Suppose that respective user devices included in the user terminal group 5 of the user A are registered in the license server 3, concerning recording/playback of a copyright protected content. Suppose that the respective user devices included in the user terminal group 13 of the user B are registered in the license server 3, concerning to recording/playback of another copyright protected content. In this case, registration in the license server 3 means that respective users have obtained licenses concerning recording/playback of desired copyright protected contents. In the following description, it is assumed that the user A has obtained the license concerning the copyright protected content desired by the user A. It is assumed that the user B has not obtained the license obtained by the user A.

The user terminal group 13 grouped by the user B are a PC 14, a PDA 15, a cellular phone 16 and a PD 17. The PC 14 includes a slot to which removable media 18 having the copyright protection function such as the semiconductor memory and the like are inserted as a matter of course, and can be connected to other user devices in the terminal group 13 by using I/F such as the USB and IEEE. The removal media IS are also the copyright protection storage media.

The above respective user devices in the user terminal groups 5 and 13 include, for example, utilizing functions of contents (for example, functions of playing back, storing, moving, connecting, dividing, converting, copying, lending, returning of contents), a function of content playback control, a function of management of contents (for example, a search function or a delete function of contents, content keys and the like based on content IDs), a function of creating contents by ripping or self-recording and the like.

The user devices are specific examples of the information recording apparatus according to an embodiment of the invention. That is, the user devices are information recording apparatuses connecting to the content server 2 which provides copyright protected contents and the license server 3 which handles licenses concerning recording/playback of copyright protected contents through the network 4, receiving and recording copyright protected, contents, which includes a writing unit which writes the copyright protected contents in the copyright protection storage media 11, 12 or 18. The writing unit writes the copyright protected contents in the copyright protection storage media 11, 12 by the simple copy-and-paste when a prescribed user (for example, user A) having a license for the copyright protected content possesses the information recording apparatus, and writes the copyright protected content in the copyright protection storage media 18 by combining a domain model which assures playback in the apparatus and a media-bind model when another user different from the prescribed user having the license of the copyright protected content possesses the information recording apparatus.

Also, the user apparatuses are specific examples of the information playback apparatus according to an embodiment of the invention, which are information playback apparatuses playing back copyright protected contents recorded in the copyright protection storage medium 11 and the like, having a playback unit which plays back the copyright protected contents from the copyright protection storage medium 11 and the like. The playback unit plays back the copyright protected content written in the copyright protection storage medium by the simple copy-and-paste when a prescribed user (user A) having a license for the copyright protected content possesses the information playback apparatus, and plays back the copyright protected content written in the copyright protection storage medium by combining the domain model and the media-bind model when another user (user B) possesses the information playback apparatus.

In these user devices, devices having a communication function through the network 4 (for example, the PC 6 and 14) can be communicated and connected between the license server 3 and the content server 2. The PC 6 and 14 are capable of downloading, for example, software for content distribution service or software for copyright management to be installed therein. Accordingly, the PC 6 and 14 receive distribution of encrypted contents from the content server 2, and receive distribution of content keys for contents or licenses including usage rules for contents from the license server 3. The PCs 6 and 14 are also capable of recording these data in storage devices such as the HDD or in removable storage media such as the semiconductor memories 11, 12 or 18 or an optical disc, an magnetic optical disc. Though not especially notified in the following description, the storage devices and removable storage media mentioned here will be specific examples of the copyright protection storage medium according to an embodiment of the invention.

The respective user devices in the user terminal groups 5 and 13 of respective users are capable of newly creating a content by self-recording (audio recording, picture recording by oneself, and the like) or ripping to be recorded in the storage device or the removal storage medium. The self-recording means that audio and the like imaged/picked up by an imaging apparatus/an audio pickup apparatus possessed by the user device itself are stored as video/audio digital data. The ripping means that digital contents (audio data, video data and the like) recorded in storage media such as a music CD, a video DVD, CD-ROM for software are extracted and converted into a file format which can be processed by a computer to be stored in the storage devices or the removal storage media.

As described above, for example, when the PD 9 and 10, the cellular phone 8 and the PDA 7 in the user terminal group 5 of the user A are connected to the PC 6, contents are downloaded in the PC 6 from the contents server 2 through the network 4. The contents which can be played back in the PC 6 can be played back also in connected respective user devices. It is also preferable that the PDA 7, the cellular phone 8, the PD 9, and the PD 10 are directly connected to the network 4 not through the PC 6, and receive copyright protected contents from the content server 2 and license information concerning copyright protection from the license server 3.

The invention relates to a copyright protection technology in which, when a prescribed user (user A) having a license of recording/playback of a copyright protected content writes the copyright protected content, in a copyright protection medium in respective user devices which are information recording/playback apparatuses, a domain model which assures playback in the device is combined with a media-bind model in a device used by another user (user B).

The user domain model is a user-bind model, in which copyright protected contents can be exchanged freely in all user devices possessed by the prescribed user and the contents can be played back in respective user devices. As a means of explicitly representing respective user devices possessed by the prescribed user, the terminals can be registered by using a user account in the license server 3. The user devices registered in the license server 3 are regarded as terminals possessed by the user, and copyright protected contents can be exchanged freely. In this model, terminals not possessed by the prescribed user (user A), namely, the terminals not registered in the license server 3 are regarded as terminals of another user (for example, the user B), and though copyright protection contents can be exchanged, it is difficult to play back the contents. The terminals not registered in the license server 3 in this case are user devices of the user B who does not have the license.

The definition of a media-bind model is explained as follows. When a copyright protected content is transferred to media with the copyright protection function such as a "MEMORY STICK" (MS)(Trademark of Sony Corporation) or a SD, it is difficult to copy the content written in the "MS" to another medium, and the content is bound with the medium. This is defined as a media bind in this case. The content which has been media-bound, can be played back at any time regardless of a possessor of the terminal. For example, both the user A and the user B have a "MS WALKMAN" (Registered Trademark of Sony Corporation), the content which, has been media-bound can be played back by either user's "MS WALKMAN". On the other hand, it is difficult to make backup copies of data easily.

The invention relates to a writing method, and a playing method of copyright protected contents in and from the copyright, protection media, in which both the user bind and the media bind are supported.

According to en embodiment of the invention, particularly, a user key is encrypted based on a unique ID corresponding to a copyright protection medium mounted or to be mounted on each user device in the user terminal group which is grouped by each user. That is, the user key is encrypted by using a unique ID for identifying a medium with the copyright protection function. For example, the license server 3 sets a device key Kdev peculiar to each user device based on the unique ID peculiar to each medium, and a user key Kusr is encrypted by the device key Kdev. The user key Kusr encrypts a content key Kc, therefore, on the side of the user device, after the user key Kusr is decrypted by the device key Kdev, the content key Kc is acquired by using the decrypted user key Kusr, and the encrypted content, namely, the content copyright of which is protected is decrypted and played back by using the content key Kc.

As described above, at the time of playback of the copyright protected content by the user device, in the case of playing back from medium, an ID unique to the copyright protection medium is surely acquired, and the user key is decrypted from that. That is to certify that playback is surely performed by another user device. Since the terminal possessed by the same user has the same user key, the content key can foe directly decrypted.

In addition, ciphers of the user key using the unique ID written in the copyright protection media are processed securely at the license server or at a client.

Each user device in the user-bind model operates as follows. First, each terminal has a unique terminal key (Kdev). A user key (Kusr) is provided for each user. When the user registers a terminal (Kdev 1), the user key (Kusr) is acquired. The user key (Kusr) is encrypted by the terminal key (Kdev1) and transferred (Enc(Kdev1, Kuser), A content key (Kc) is encrypted by the user key (kusr). A license includes usage rules and Enc (Kusr, Kc). The acquired license is embedded in the content.

On the other hand, each DRM in the media bind operates as follows. First, an encrypted content is written in a medium in a format in accordance with a protection method of the medium (copyright protection storage medium). The license is written in the medium, converted into the format in accordance with the protection method of the medium. The license and the content key are securely written by using secret data or an area of the medium. That is, even if the content and the license are simply transferred to another medium, it is difficult to play back the content by the medium which has been copied as long as data written in the secret area is not copied.

Though the details concerning processing of embodiments of the invention will be described later, an outline of the processing will be described below. First, when the copyright protected content and the license are written in the medium (copyright protection storage medium), the user key (Kusr) is encrypted by using data unique to the medium (ID and the like). The encrypted data Enc (Kid, Kusr) is written in the medium as it is. The data is generated on the service side (license server) or on the terminal (user device) side. The content and the license are written in the medium as they are. According to the processing, playback can be performed by the medium itself as well as the user bind can be supported.

The license server 3 give a license to the user, which is necessary for the user to use a content provided from the later-described content, server 2. The content key necessary for user to decrypt the encrypted content is transmitted securely to the user, and the content is shared between devices possessed, by the user, while limiting playback of the content. Specifically, the license server performs registration processing of users, user devices possessed by the users, or copyright, protection storage media, and performs encryption of the content key to be transmitted to the user device.

The content server 2 is a server providing contents such as copyright protected contents to the user A or the user B. The content, server 2 distributes copyright protected contents to a user device possessed by the user A through the network 4 in accordance with, for example, a request from any of user devices among the user terminal group 5 of the user A. The content server 2 also distributes copyright protected contents to a user device possessed by the user 8 through the network 4 in accordance with, for example, a request, from any of user devices among the user terminal group 13 of the user B.

For example, when a music content is distributed, the content server 2 is formed as a server which provides an Electric Music Distribution (EMD) service. In this case, the content server 2 compresses and encodes the music content to be distributed by a compressing and encoding method, for example, an ATRAC 3 (Advanced Transform Acoustic Coding) method or a MP 3 (MPEG Audio Layer-3) method, and encrypts the content by a DBS (Data Encryption Standard) and the like, then, distributes the content to the user device. The content server may also transmit a content key for decrypting the content after decrypting the key with the encrypted content as described above. The content server may further provide the content key to the license server 3, and the license server 3 may encrypt the content key and transmit it to the user device.

The content server 2 can be also formed as a server which provides a created content utilization service managing use of contents created by user devices belonging to the user terminal, groups 5 and 13 of respective users, for example, by ripping, self-recording and the like. In this case, the content server 2 distributes a content key which decrypts the content to the user device. Accordingly, the user device can play back the content created by ripping and the like by itself based on the content, key acquired from the content server 2.

The network 4 is a communication network connecting the user devices to the license server 3 and the content server 2 to be communicable to one another. The network 4 includes, for example, public networks such as Internet, a telephone network and a satellite network, or dedicated networks such as WAN, LAN, IP-VPN, and both wired/wireless networks can be applied.

The content providing system 1 of the above configuration improves portability of contents between respective user devices while securing the copyright management function which limits the use of contents, which increases the convenience and the degree of freedom for using contents.

Hardware configurations of user devices will be explained. Hereinafter, as typical examples, hardware configurations of the PCs 6 and 14, the PDs 9, 10, and 17 will be explained. Each of the PCs 6 and 14, the PDs 9, 10, and 17 which are user devices is formed as an embodiment of the information recording/playback apparatus.

Figure 2:
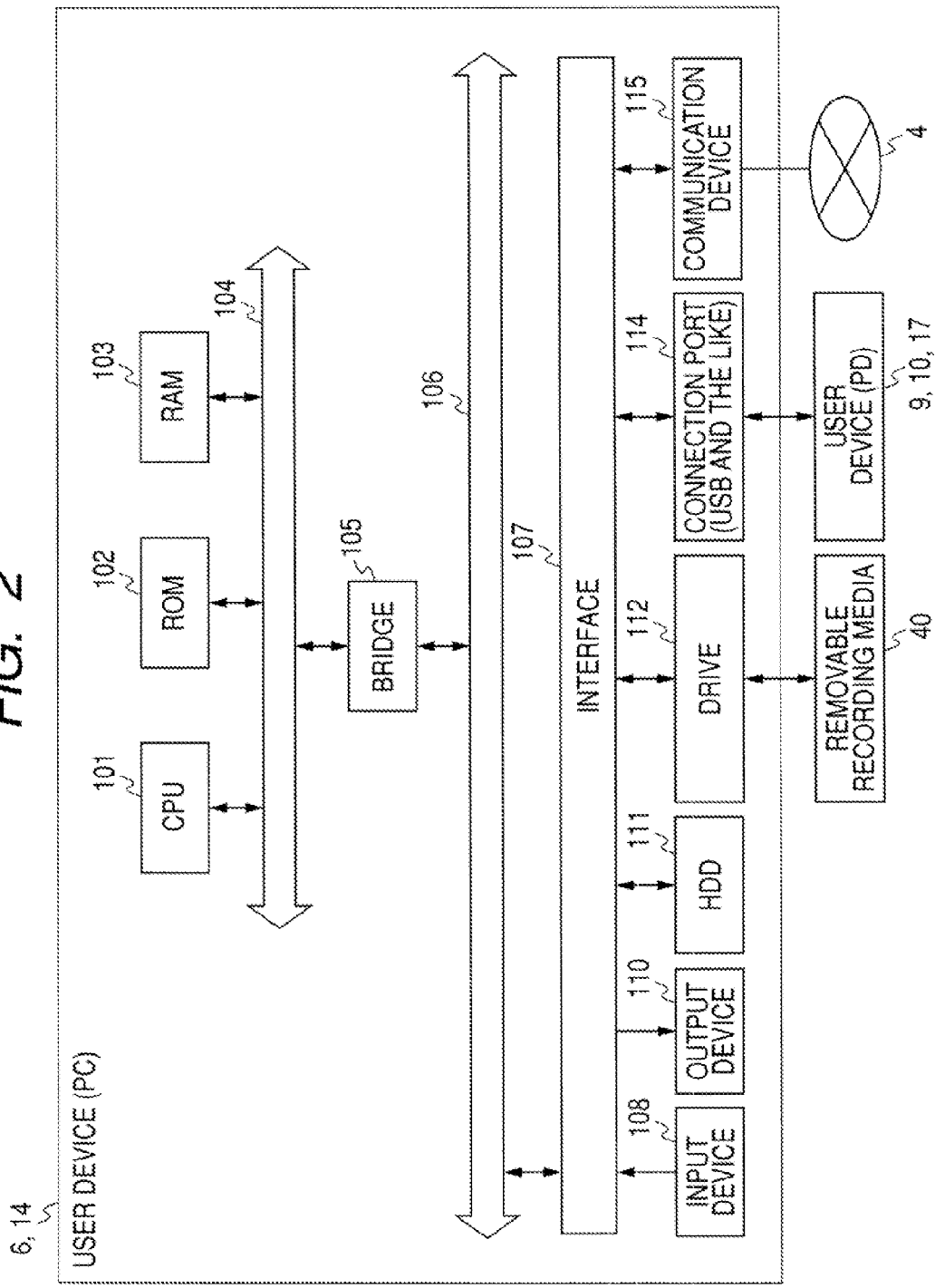
FIG. 2 is a hardware configuration diagram of PCs according to an embodiment.

First, with reference to FIG. 2, the hardware configuration of the PCs 6 and 14 according to the embodiment will be explained. FIG. 2 is a block diagram schematically showing an example of the hardware configuration of the PCs 6 and 14 according to the embodiment.

As shown in FIG. 2, the PCs 6 and 14 include, for example, a CPU (Central Processing Unit) 101, a ROM (Read Only Memory) 102, a RAM (Random Access Memory) 103, a host bus 104, a bridge 105, an external bus 106, an interface 107, an input device 103, an output device 110, a storage device (HDD) 111, a drive 112, a connection port 114 and a communication device 115.

The CPU 101 functions as a computing processing device and a control device, operating in accordance with various programs stored in the ROM 102 or the HDD 111 to control respective units in the PCs 6 and 14. As specific processing, for example, encryption/decryption processing of contents, generation and verification processing of digital signatures (MAC (Message Authentication Code) and the like) for preventing data tampering and for data verification, authentication and session key sharing processing performed with respect to another connected user device at the time of input and output of contents and the like, input and output processing control of contents, licenses and content keys and the like, and further copyright management processing such as license evaluation and the like are performed.

The ROM 102 stores programs, computing parameters and the like used in the CPU 101. The ROM 102 can be used as a storage means for storing contents, licenses and content keys and the like. The RAM 103 temporarily stores programs used in execution by the CPU 101, parameters appropriately changing in the execution and the like. They are connected by the host bus 104 including a CPU bus and the like to one another.

The host bus 104 is connected to the external bus 106 such as PCI (Peripheral Component Interconnect/interfaces bus through the bridge 105.

The input device 108 includes, for example, operation means such as a mouse, a keyboard, a touch panel, buttons and switches, and levers, and an input control circuit which generates input signals to be outputted to the CPU 101. The users A and B of the PCs 6 and 14 can input various data or instruct processing operations with respect to the PCs 6 and 14 by operating the input device 108.

The output device 110 includes, for example, a display device such as a CRT (Cathode Rat Tube) display device, a liquid crystal display (LCD) device, and a ramp, an audio output device such as a speaker. The output device 110 outputs, for example, contents which are played back. Specifically, the display device displays played-back video contents by motion pictures or still pictures in text or image. The audio output device outputs played-back audio contents.

The HDD 111 is a device for storing data, which is formed as an example of a storage means of the PCs 6 and 14 according to the embodiment. The HDD 111 stores programs executed by the CPU 101 and various data in a hard disc. In addition, various data such as contents, licenses ana content keys are stored in the HDD 111.

The drive 112 is a reader/writer fox storage media, which is provided inside or outside the PCs 6 and 14. The drive 112 records and plays back various data such as contents, licenses and content keys with respect to a removable storage media 40 (specific examples of the copyright protection storage medium according to the embodiment of the invention, which are shown by the copyright protection storage media 11, 12 in FIG. 1) such as a magnetic disc (HD and the like), an optical disc (CD, DVD and the like), an optical magnetic disk (MO and the like), or a semiconductor memory loaded on the PCs 6 and 14.

Specifically, the drive 112 reads out data stored in the removal storage media 40, and supplies it to the RAM 103 connected through the interface 107, the external bus 106, the bridge 105, and the host bus 104. The CPU 101 stores these data to the ROM 102 or the HDD 111, if necessary. The drive 112 receives data stored in the ROM 102 or the HDD 111 and the like, data which is newly generated, and data acquired from external devices from the CPU 101 and writes these data in the removable storage media 40.

The removal storage media 40 have a function of protecting copyright of contents at the time of recording and playing back contents. In the embodiment of the invention, they are copyright protection media in which copyright protected contents are recorded by information recording apparatuses (user devices) in the content providing system 1, in which the copyright protected contents are written by the simple copy-and-paste when the user device is possessed by the user, and the copyright protected contents are written by combing a domain model which assures playback in the device and a media-bind model when the user device is possessed by another user.

The connection port 114 is a port connecting, for example, the PCs 6 and 14 to other devices, for example, external peripheral devices such as the PDs 9, 10 and 17, having connection terminals such as the USB, IEEE 1394. The connection port 114 is connected to the CPU 101 and the like through the interface 107, the external bus 106, the bridge 105, the host bus 104 and the like. Various data will be communicable by such connection port 114, connecting to the PCs 6 and 14, the PDs 9, 10, 17 and the like through the local line 4.

The communication device 115 is a communication interface including communication devices and the like for connecting to the network 4. The communication device 115 transmits and receives various data such as contents, content keys with respect to other external devices such as other user devices, the license server 3, the content server 2 and the like through the network 4.

Figure 3:
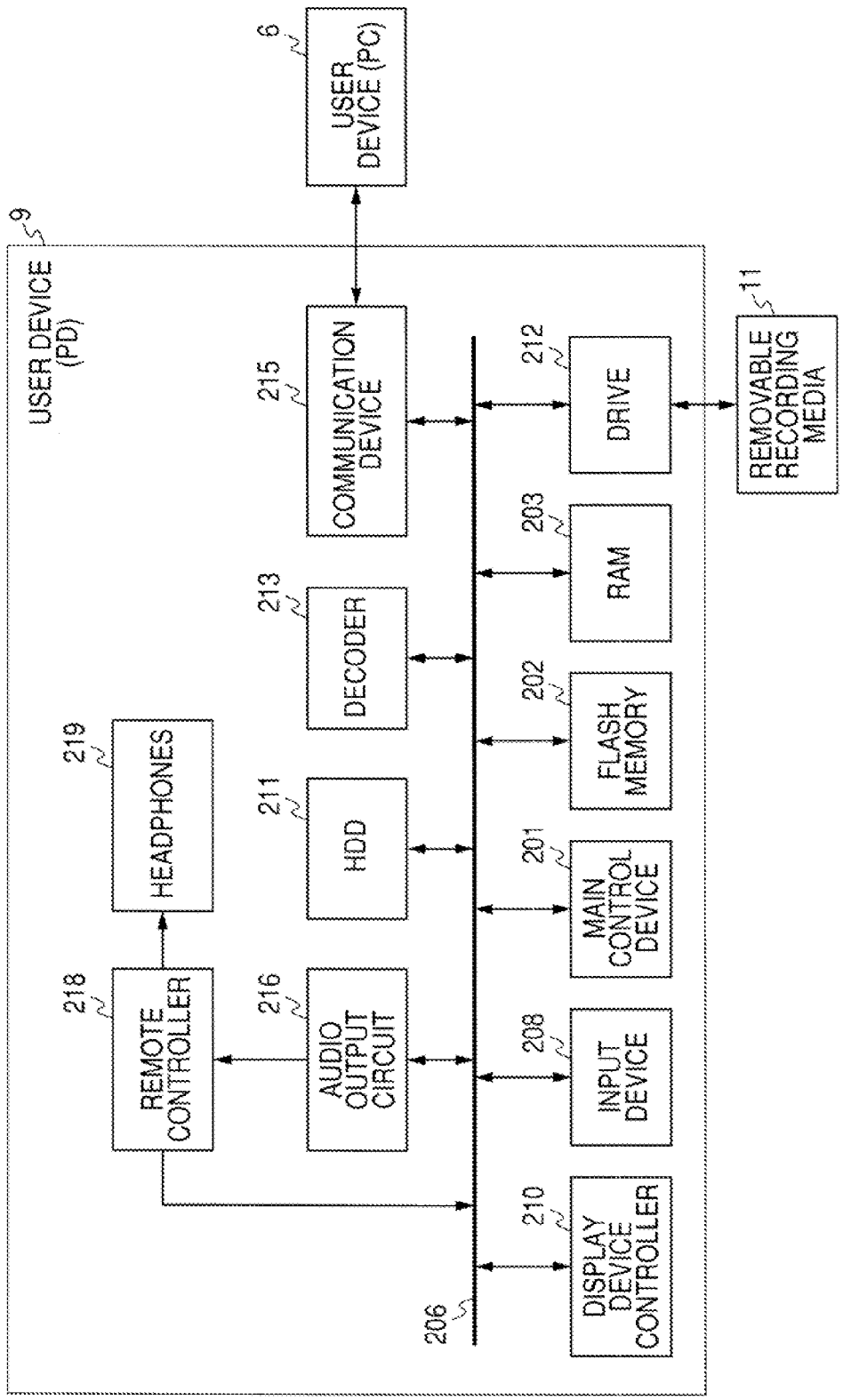
FIG. 3 is a hardware configuration diagram of PDs according to the embodiment.

Next, with reference to FIG. 3, the hardware configuration of the PDs 9, 10 and 17 according to the embodiment will be explained. FIG. 3 is a block diagram schematically showing an example of the hardware configuration of the PD 9 of the user A. The configurations of the PD 10 of the user A and the PD 17 of the user B are the same.

As shown in FIG. 3, the PD 9 includes, for example, a control device 201, a flash memory 202, a RAM 203, a bus 206, an input device 208, a display device 210, a HDD 211, a drive 212, a decoder 213, a communication device 215, an audio output circuit 216, a remote controller 218 and headphones 219.

The control device 201 operates in accordance with various programs stored, for example, in the flash memory 202 and the HDD 211, controlling respective portions of the PD 9. The flash memory 202 stores, for example, programs prescribing operations of the control device 201 and various data. The ROM 102 can be used as a storage means for storing contents, licenses and content keys. The RAM 203 includes, for example, a SDRAM (Synchronous DRAM), temporarily storing various data concerning processing of the control device 201.

The bus 206 is a data line connecting the control device 201, the flash memory 202, the RAM 203, a data processing device 204, the input device 208, the display device 210, the HDD 211, the drive 212, the decoder 213, the communication device 215, the audio output circuit 216 and the like.

The input device 208 and the remote controller 213 include, for example, operation means such as a touch panel, button keys, levers, dials, and an input control circuit which generates input signals in accordance with operation with respect to the operation means by the user. The user of the PD 9 can input various data and instruct processing operations with respect to the PD 9 by operating the input, device 208 or the remote controller 213.

The display device 210 includes, for example, a LCD panel and a LCD control circuit. The display device 210 displays various information in text or in image according to control of the control device 201.

The HDD 211 is a device for storing data formed as an example of a storage means of the PD 9 according to the embodiment. The HDD 211 includes a hard disc drive (HDD) having storage capacity of, for example, several dozen GB, which stores contents, licenses, content keys, programs of the control device 201, and various data. The PD 9 including the BDD 211 is formed as a content recording/playback device which can record and play back contents. Accordingly, it becomes possible that not only contents provided from the PC 6 through the removable media 11 but also contents received from the PC 6 and the like through the local line are stored in the HDD 21 and played back. However, it is not limited to the example, and it is also preferable that the PD 9 does not include the HDD 211 and formed as a playback-only device of contents. In this case, the PD 9 can only read out and play back contents stored in, for example, the removable storage media 11 (incapable of recording).

The drive 212 is a reader/writer for storage media, which is provided inside the PD 9. The drive 212 records and plays back various data such as contents, licenses, and content keys with respect to the various removable storage media 11 loaded on the PD 9. The decoder 213 performs decoding processing of encrypted contents, surround processing, conversion processing to PCM data, and the like.

The communication device 215 includes, for example, a USB controller, a USB terminal and the like, which transmits and receives various data such as contents, licenses, content keys, and control signals with respect to the user devices such as the PC 6 which is connected through the local line such as a USB cable.

The audio output circuit 216 amplifies analog audio data decoded by the decoder 213 and DA-converted by the control device 201 and outputs the data to the remote controller 218. The analog audio data is outputted from the remote controller 213 to the headphones 219, and audio-output ted from a speaker (not shown) provided inside the headphones 219.

As described above, in FIG. 2 and FIG. 3, the hardware configuration examples of the PCs 6, 14, the PD 9 and the like as examples of the user devices have been explained. However, user devices using contents are not limited to examples of the PCs 6, 14, the PD 9 and the like, and it can include the PDAs 7 and 15, the cellular phones 8, 16 as shown in FIG. 1, and further, stationary audio players, other television devices, various electronic devices and information processing apparatuses. Therefore, the user devices execute processing according to the hardware configuration peculiar to each device.

In the hardware configuration example of the PCs 6, 14, the PD 9 and the like, a writing unit writing copyright protected contents in the copyright protection storage media 11, 12 or 18 (shown as the removable media 40 in FIG. 2) is the CPU 101 which controls writing by the drive 112. The CPU 101 writes the copyright protected contents to the copyright protection storage media 11, 12 by a simple copy-and-paste when the user device is possessed by the prescribed user (user A), and writes the copyright protected contents in the copyright protection storage medium 18 by combining a domain model which assures playback in the device and a media-bind model when the user device is possessed by another user (user B).

In the hardware configuration example of the PCs 6, 14, the PD 9 and the like, a playback unit playing back copyright protected contents from the copyright protection storage media 11, 12 or 18 (shown as the removable media 40 in FIG. 2) is the CPU 101 which controls playback of contents from the removable storage media 40 by the drive 112. The CPU 101 plays back the copyright protected contents written in the copyright protection storage media 11 and the like by the simple copy-and-paste when the information playback apparatus is possessed by the prescribed user (user A), and plays back the copyright protected contents written in the copyright protection storage medium 18 by combining a domain model and a media-bind model when the information playback device is possessed by another user (user B).

Figures 4, 5, 6:
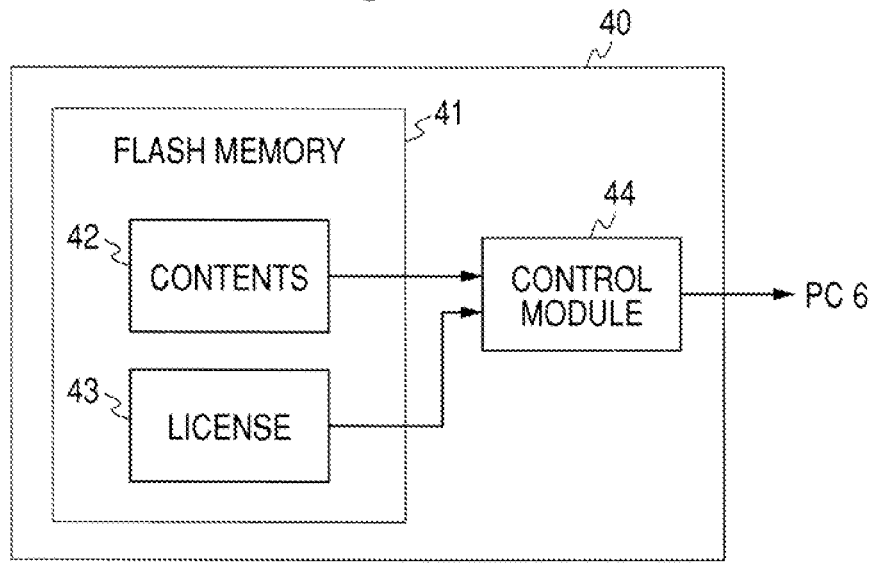
FIG. 4 is a configuration diagram of a removal recording medium.
FIG. 5 is a chart for explaining usage rules.
FIG. 6 is a chart for explaining specific examples of the usage rules.

Next, the removable storage media 40 such as the semiconductor memory mounded, on the user devices (PCs) shown in FIG. 2 will be explained. FIG. 4 is a configuration diagram of the removable storage media 40. The removable storage medium 40 includes a control module 44 which controls data input and output and performing encryption processing of data, and a flash memory 41 storing copyright protected contents 42 and license data 43 including an ID unique to the medium. The copyright protected contents 42 are transmitted from the content server 2. The license data 43 is transmitted from the license server 3. The license data 43 is written in a usage rule shown in FIG. 5, including usage rules, a leaf ID shown in FIG. 6. The usage rules include information of an expiration date for use until which the content can be used based on the license, an expiration date for download until which the content can be downloaded based on the license, the number of times the content can be copied based on the license (permitted times of copy), the number of check-out times, the maximum check-out times, a right for recording the content in a CD-R based on the license, the number of times the content can be copied in the PD, a right which can move the license to ownership (purchase state), a duty for taking a use log and the like. The details of the license will be described later, which includes a media-unique ID of the copyright protection medium registered in the license server 3.

Figure 7:
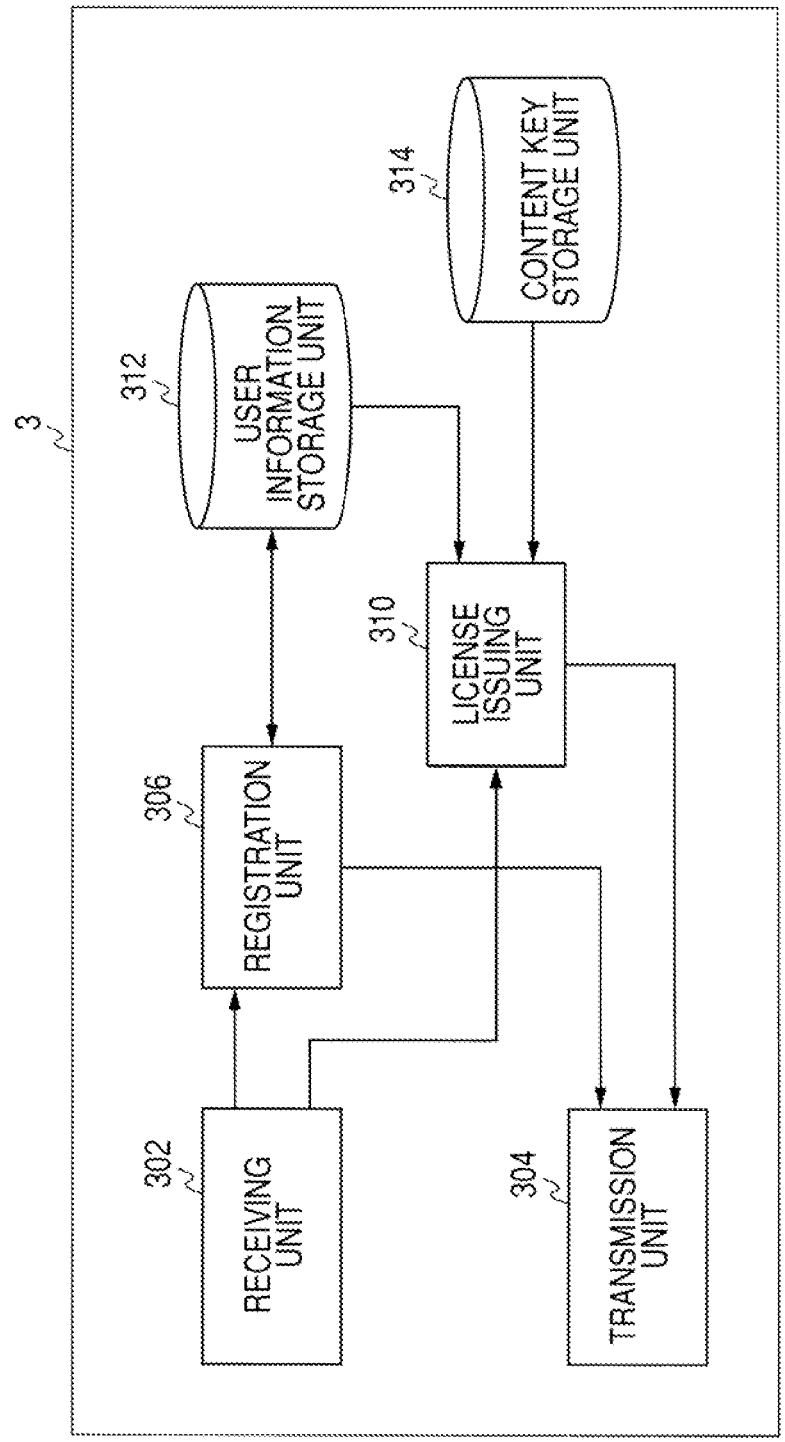
FIG. 7 is a function configuration diagram of a license server 3.

Next, a function configuration of the license server 3 will be explained with reference to FIG. 7. Since the hardware configuration is the same as the configuration of the PCs 6, 14 shown in FIG. 2, it will be omitted. As shown in FIG. 7, the license server 3 includes a receiving unit 302, a transmission unit 304, a registration unit 306, a link issuing unit 308, a license issuing unit 310, a user information storage unit 312, a content key storage unit 314 and the like.

The receiving unit 302 is a communication interface including, for example, a communication line, a communication circuit, a communication device ana the like, which receives attribute information of the user device connected through the network 4 or receives information inputted in the user device.

The registration unit 306 performs registration processing of a new user requesting the use of a content providing service/copyright management service, registration change processing, registration cancel processing and management of user account, information (user IDs, credit numbers, passwords and the like). To users who are registered in these services, a peculiar key is given to each user. The key given in this case may be a public key and a secret key which will be a pair used in the public key cryptosystem, or a common key used in the secret key cryptosystem. The key information is stored in the user information storage unit 312 with user IDs.

The registration unit 306 performs management of the user devices possessed by the user. The registration unit 306 acquires specific information of the user device (a type, a model, a version and the like of the device) through the receiving unit 302, giving a device ID and a key unique to the user device. The device ID is identification information which can uniquely specify the user device. It is also preferable that the registration unit 306 acquires the device ID previously set to the user device to manage the user device by the device ID.

As described above, the key information given by the registration unit 306 is stored in the user information storage unit 312, being associated with the user ID or the device ID. The registration unit 306 generates the user ID or the device ID and key information as node information, transmitting the information to each user and each user device through the transmission unit 304. The user ID or the user device receiving the node information acquires an ID uniquely identified in the license server 3.

The key given in the registration 306 is used for encrypting the content key by the content server 2, or used for decrypting the content key encrypted by the user device. For example, when a content key is encrypted by the public key of the user in the content server 2, it is necessary for the user received the content key to decrypt the content key by the secret key of the user. Therefore, in this case, it is necessary to transmit the secret key of the user to the user.

Generally, the license server 3 can acquire key information corresponding each user or each user device stored in the user information storage unit 312 by acquiring the user ID or the device ID.

With reference to FIG. 8, user information stored in the user information storage unit 312 will be explained. As shown in FIG. 8, information such as a user ID 3121, a credit, card numbers 3122, a user key 3123, a device ID 2124, a device key 3125 and the like are stored in the user information storage unit 312.

The user ID 3121 and the credit numbers 3122 are user account information of a user who receives services from the content providing service and the copyright management service, which is identification information uniquely identifying the user A or the user B. The user key 3123 is key information allocated to the user ID 3121.

The device ID 3124 stores IDs of user devices, which are IDs of the user devices possessed by users. The device ID 3124 may be numbers uniquely identified in the content providing system 1, and may be identification numbers set to the user device previously at the shipment from the factories, or may be identification numbers set by the registration unit 306 of the license server 3.

The device key 3125 stores key information allocated to each user devices. Also concerning to the device key 3125, it is preferable that device keys previously set to the user devices are stored, or that device keys allocated by the registration unit 306 are stored.

In addition, in the case of the user-bind model, the user information storage unit 312 stores data concerning copyright protection storage media managed by each user, associated with respect, to users as shown in FIG. 9. The user A in the user 3121 stores the user key 3123 as Kusr A, and the device key 3125 concerning copyright protection storage media to be mounted on respective user devices included in the user terminal group 5 of the user A as Kdev1, Kdev2, Kdev3 .... The user B in the user 3121 stores the user key 3123 as Kusr B, and the device key 3125 concerning copyright protection storage media to be mounted on respective user devices included in the user terminal group 13 of the user B as Kdev4, Kdev5 ...

Return to FIG. 7, the license issuing unit 310 issues a license including a content key to the user who purchased the content. At this time, the license issuing unit 310 can securely distribute the content key to the user by encrypting the content, key included in the license by the secret key of the user. The license may also include usage rules and the like of the content. The content key and usage rules of the content may also be provided by the content server 2.

The license issued in the license issuing unit 310 is transmitted to the user devices (PCs 6 and 14) through the transmission 304. The license may also be stored in the user information storage unit 312.

The license includes a content ID and the like which identifies the content. The user may acquire the license from the license server 3 after purchasing the content, or may acquire the license before purchasing the content in advance, and then, purchase the content.

It is also preferable that the content key storage unit 314 which stored content keys and the license issuing unit 310 are provided in the content server 2. In that case, the content server 2 may acquire information such as the user key and the like which encrypts the content key from the license server 3 and generate a license by encrypting the content key. The license generated in the content server 2 may be transmitted to the user device possessed by the user with the content.

The transmission unit 304 is a communication interface including, for example, a communication line, a communication circuit, a communication device and the like, having a function of transmitting node information registered and issued at the registration unit 306, and licenses issued by the license issuing unit 310 to the user devices through the network.

The content key storage unit 314 stores the content keys, and may receive content keys generated at the content server 2 to be stored therein, and may generate and store content keys at the license server 3. For example, it is preferable that a content key is generated at the license server 3 and the content key is transmitted to the user device, further, transmitted to the content server 2. The content server 2 received the content key may encrypt the content purchased by the user by the content key, and transmit the encrypted content to the user device. The function configuration of the license server 3 has been described as the above.

Figure 10:
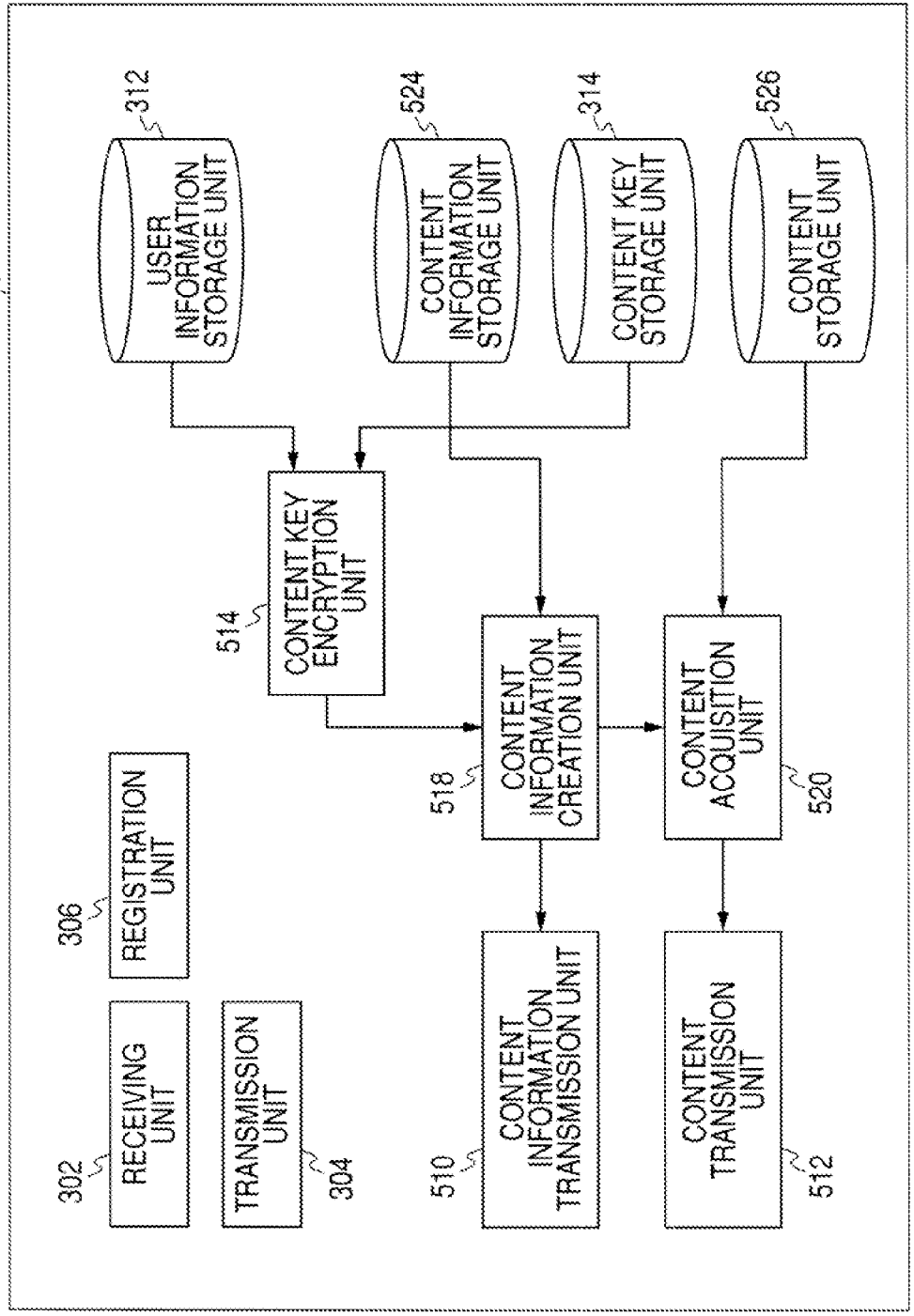
FIG. 10 is a function configuration diagram of a content server.

Next, the function configuration of the content, server 2 will be explained with reference to FIG. 10. Since the hardware configuration is the same as the configuration of the PCs 6, 14 shown in FIG. 2, it is omitted. The content server 2 is a computer which provides content information to respective user devices in the user terminal group 5 of the user A and respective user devices in the user terminal group 13 of the user B as described above. The content information includes meta information of contents, content keys and the like. The content server 2 can also transmit contents corresponding to content information to the respective user devices. The content server 2 further includes the function of the above license server 3.

The content server 2 includes, for example, a receiving unit 302, a transmission unit 304, a registration unit 306, a content information transmission unit 510, a content transmission unit 512, a content key encryption unit 514, a content information creation unit 518, a content acquisition unit 520, a user information storage unit 312, a content information storage unit 524, a content key storage unit 314, and a content storage unit 526 and the like.

Since the receiving unit 302, the transmission unit 304, the registration unit 306, the user information storage unit 312 and the content key storage unit 314 have almost the same functions as the units of the above license server 3, explanations thereof are omitted.

The content information storage unit 524 stores identification information of contents and meta information of the contents, associating them with each other. The meta information of contents is information showing features of the contents. The content information storage unit 524 includes a RAM, a HDD and the like.

The content key encryption unit 514 encrypts a content key unique to a content by a user key unique to the user. Specifically, when the content key encryption unit 514 acquires a user ID and a content ID, the unit acquires a user key associated with the user ID from the user information storage unit 312, acquires a content key associated with the content ID from the content key storage unit 314, and encrypts the acquired content key by the acquired user key. More particularly, digital information (content key) as regulations for encrypting the content is recomposed by using prescribed regulations set as the user key. The content key encryption unit 514 provides the encrypted content key to the content information creation unit 518.

The content information creation unit 518 creates content information to be provided to the user. Specifically, the content information creation unit 518 acquires the user ID and the content ID, and acquires the encrypted content key from the content key encryption unit 514. The content information creation unit 518 acquires meta information such as a title name, an artist name and the like associated with the acquired content ID from the content information storage unit 524. The content information creation unit 518 also generates information of use limitation of the content. The information of use limitation of the content is information of limiting playback of the content which is, for example, the number of times playback can be performed or a period of time playback can be performed. Furthermore, the content information creation unit 518 acquires a device ID associated with the acquired user ID from the user information storage unit 312. The content information creation unit 518 provides the content ID, the meta information of the content, the content key, the user ID as content information to the content information transmission unit 510. The content information creation unit 518 also provides the device ID acquired as the above to the content information transmission unit 510, and provides the content ID and the device ID to the content acquisition unit 520.

The content information transmission unit 510 transmits content information to the user. Specifically, the content information transmission unit 510 acquires the device ID, the user ID, the content ID, meta information of the content and the content key from the content information creation unit 518 and transmits the content ID, the meta information of the content, the content key and the user ID to a content playback device 506 specified by the device ID.

The content acquisition unit 520 acquires the content from the content storage unit 526, which is associated with the content ID acquired from the content information creation unit 518, and provides the content to the content transmission unit 512 with the device ID acquired from the content information creation unit 518.

The content transmission unit 512 transmits the content acquired from the content acquisition unit 520 to the content playback device 506 specified by the device ID acquired from the content acquisition unit 520. The function configuration of the content server 2 has been described as the above.

Figure 11:
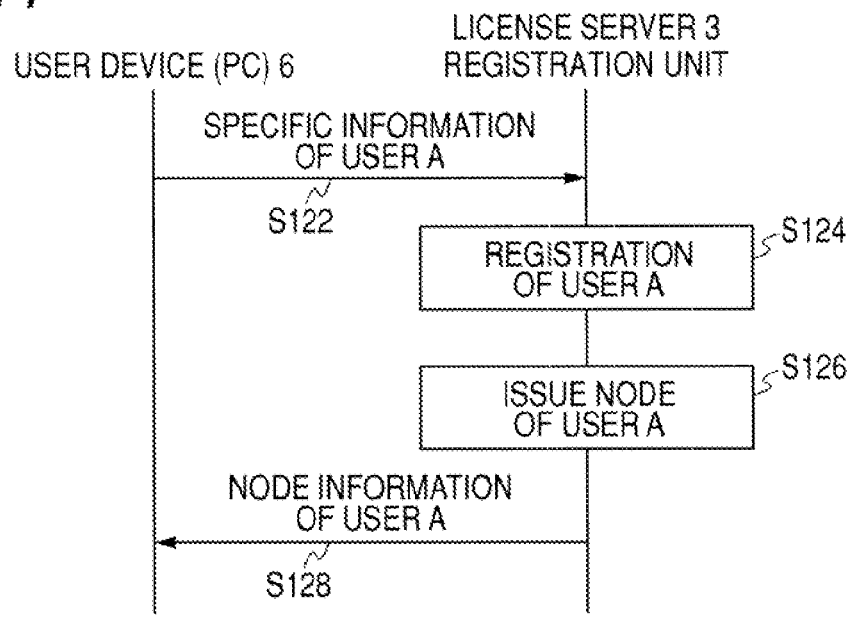
FIG. 11 is a diagram explaining registration of a user and generation of a user key.

Next, registration of the user and generation of the user key will be explained with reference to FIG. 11. The registration processing of the user A is performed through the user device (PC) 6 connected to the network 4. That is, the user registration is performed from the user device (PC) 6 to the license server 3. The user key is generated in the license server 3 based on the user registration.

First, specific information of the user A is transmitted to the license server 3 (S122). The specific information of the user A is the user ID of the user A, numbers of a credit card possessed by the user A and the like. The user ID is identification information which can be uniquely specified in the license server 3, and may be identification information indicated by the user A or may be given in the license server 3.

In Step S122, the licenser server 3 to which specific information of the user A has been transmitted performs registration processing of the user A (S124). In Step S124, the license server 3 stores the user ID of the user A, credit card numbers and the like in the user information storage unit 312. The license server 3 also issues the user key of the user A and stores the key in the user information storage unit 312, associating it with the user ID and the like.

Then, the license server 3 issues a node of the user A including the user ID and the user key stored in the user information storage unit 312 (S126). The license server 3 transmits node information issued in Step S126 to the user device (PC) 6.

As described above, the user having the user device registers the user device possessed by himself/herself in the license server 3 through the network 4. The user also performs user registration of the user using the content providing service or the copyright management service. Accordingly, the license server 3 providing the copyright management service can store and manage information of the user who desires to use the copyright management service or information of user devices possessed by the user in the user information storage unit 312. In addition, key information issued with respect to each user and each user device can be stored and managed in the user information storage unit, being associated with the user and the user device.

The license server 3 is capable of acquiring the user ID of the user A through the user device connected to the network 4, and leaning user devices possessed by the user or key information of the user. For example, it is preferable to further encrypt, the content key by the user key of the user A in order to securely distribute the content key to the user which has been used for encryption of the content. The license server 3 acquires an encryption key of the user A stored in the user information storage unit 312 based on the acquired user ID of the user A and encrypts the content key by the user key of the user A. It is difficult to decrypt the content key encrypted by a public key of the user A without using a secret key of the user A, therefore, it becomes possible that the license server 3 securely transmits the content key to the user. In addition, since only the user A who purchased the content can decrypt the content key, it is possible to confine users who can decrypt the content key.

As the matter of course, when the license server 3 is the same as the content server 2, the user registration is performed and the user key is generated by the united server. It is also preferable that the user registration is performed by redirecting to the license server 3 when the user device (PC) 6 gets access to the content server 2, and the user key is generated in the license server 3.

Figure 12:
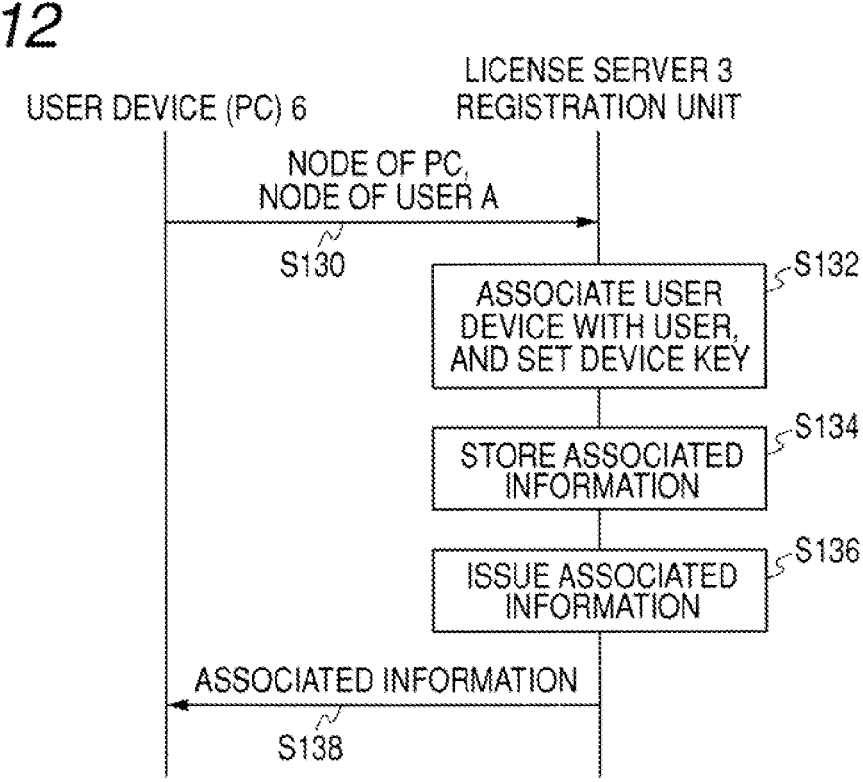
FIG. 12 is a diagram explaining processing procedure performing registration of a device key.

Next, a processing procedure in which registration of a device key of a copyright protection storage medium is performed after the user registration explained by using FIG. 11 will be explained with reference to FIG. 12. In this case, the device key is issued from the license server 3 at the time of registration, however, the device key may foe embedded at the time of shipping. That is, it is preferable that the device key previously set in the copyright protection storage medium is stored, or that key information allocated by the registration unit. 306 is stored.

First, the user device (PC) 6 connected to the network is associated with the user A. When the user device (PC) 6 is associated with the user A, a node of the user device (PC) 6 and a node of the user A issued by the above registration processing are transmitted to the license server 3 (S130).

In Step 3130, the registration unit 306 of the license server 3 which acquired node information of the user device (PC) 6 and node information of the user A associates the user device (PC) 6 with the user A (S132). At this time, the registration unit 306 allocates and sets a device key uniquely to the copyright protection medium mounted on the user device (PC) 6. In the association processing of in Step S132, for example, node information of the user device (PC) 6 is associated with node information of the user A. The node information may be information which can uniquely identify the user device and the user, and may be the device ID of the user device and the device ID of the user.

Associated information which has been associated in Step S132 (including the device key) is stored in the user information storage unit 312 in Step S134. Accordingly, the license server 3 can manage user devices stored in the user information storage unit 312 and that the copyright protection medium is associated to which user. Then, information of association between the device ID of the user device and the user ID of the user (including the device key) is issued (S136) and transmitted to the user device (PC) 6 (S133). As described above, the associated information transmitted to the user device (PC) 6 includes key information in which secret information of the user A is encrypted by the public key of the user device (PC) 6.

The user device (PC) 6 which receives associated information in Step S138 can learn that the device itself and the mounted copyright protection storage medium are associated to which user, by the received associated information. When the user device (PC) 6 is associated with the user A, the device can learn secret information of the user A by key information (device key) included in the associated information. For example, when the user A registers itself in the content providing service and purchases a content, the content is transmitted to the encrypted user A. A content key which encrypts the content is encrypted by a secret, key of the user and transmitted to the user device (PC) 6 possessed by the user A. At this time, when the user device (PC) 6 is associated with the user A and further the device key is set, the user device (PC) 6 can acquire secret information of the user A included in the associated information transmitted by the license server 3, and decrypt the encrypted content key.

Next, a processing procedure in which the license issuing unit 310 of the license server 3 issues a license according to the user ID and the content ID will foe explained with reference to FIG. 13.

Figure 13:
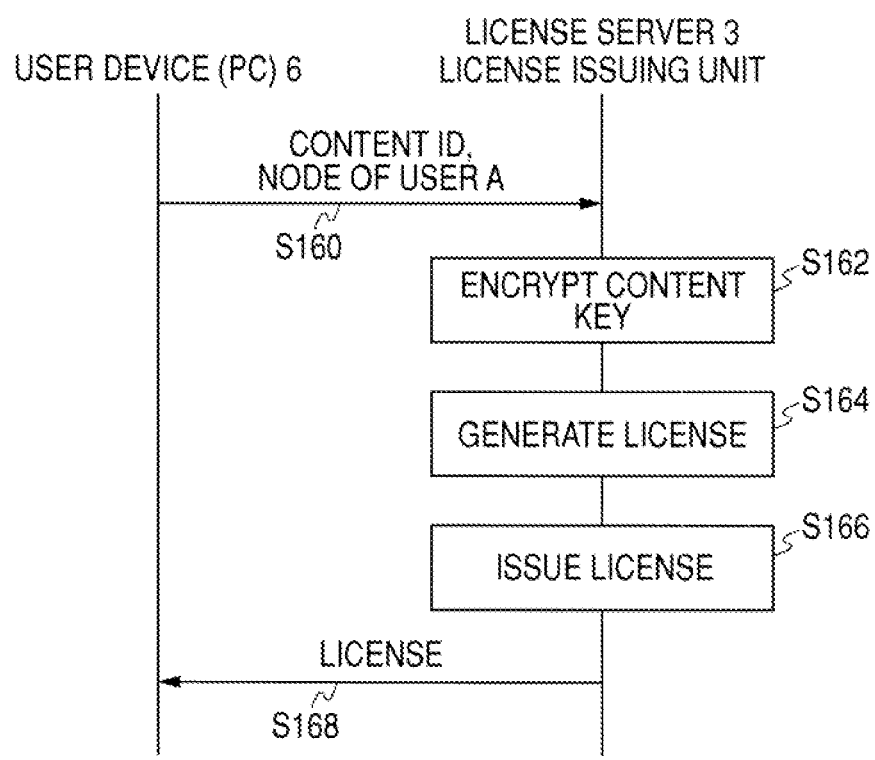
FIG. 13 is a timing chart explaining issue of a license in the license server.
Figure 14:
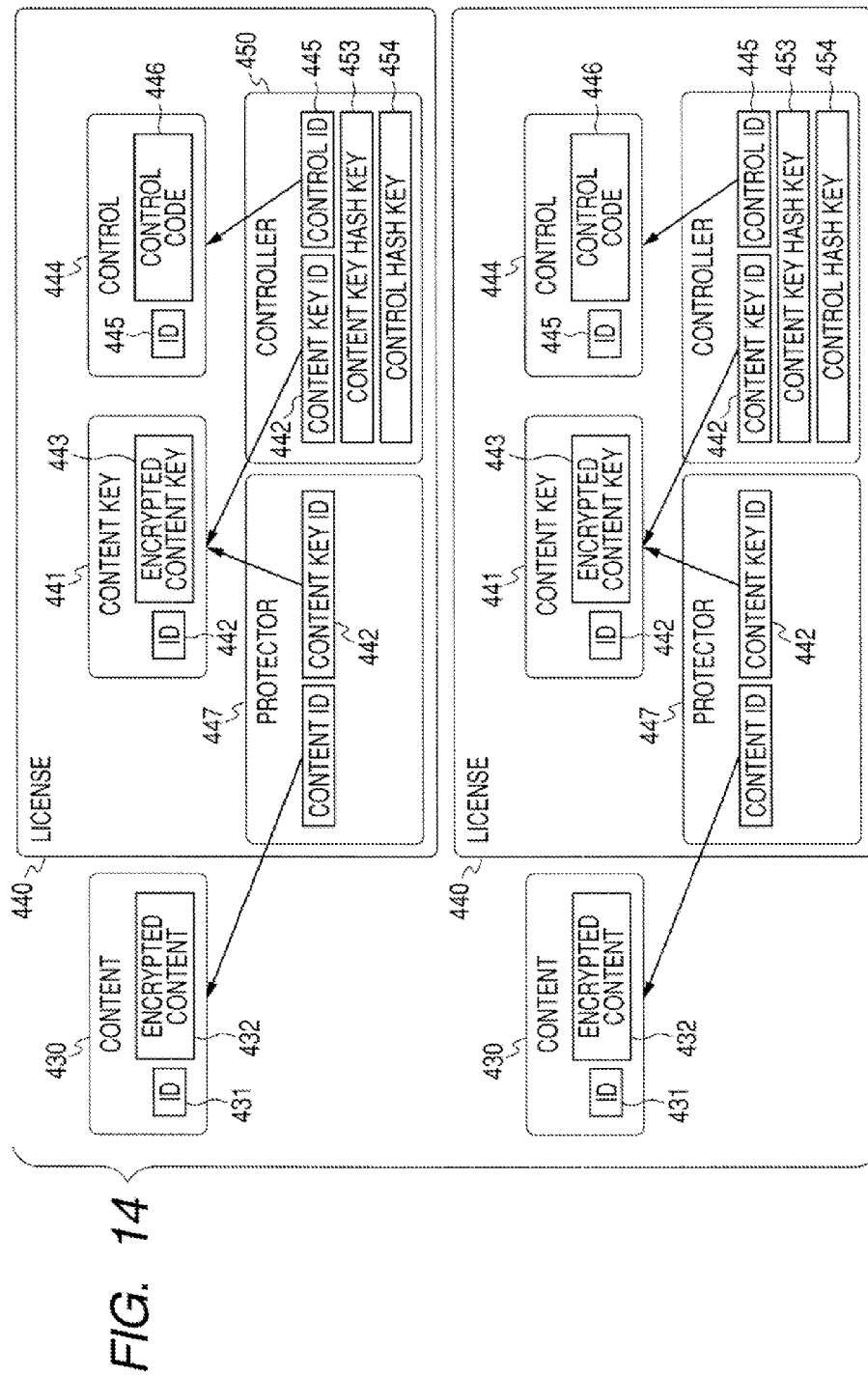
FIG. 14 is a diagram for explaining the license.

FIG. 13 is a timing-chart explaining about the issue of the license in the license server 3. The license issued in the license server 3 includes information such as the content key decrypting the content, which is necessary for playing back the content purchased by the user. The content key included in the license is further encrypted by the user key and the like, and the user device and the like which acquired the license can learn that the content key is encrypted by which user key from each information included in the license. The user device and the like which acquired the license can play back the content encrypted by the content key when the content key is decrypted based on the above associated information (including the device key concerning the copyright protection storage medium) and the like. In FIG. 13, the user device (PC) 6 transmits the content ID uniquely identifying the content and node information of the user A to the license server 3 to acquire a license necessary for playing back the content (S160). As described above, when the user device possessed by the user A is associated with the user A, the user device associated with the user A can use the license issued for the user A.

In Step S160, the license server 3 which has received the content ID and node information of the user A encrypts the content key which encrypted the content by the public key of the user A (S162). The license server 3 generates a license including the content key encrypted in Step S162 (3164).

The license generated in Step S164 will be explained with reference to rig, 14. As shown in FIG. 13, a license 440 includes a content key 441, a control 444, a protector 447, a controller 450 and the like. The content 430 is encrypted by the content key included in the license and transmitted from the content server 2.

The content key 441 included in the license 440 is encrypted by a key included in node information transmitted by the user device (PC) 6. For example, when node information of the user A is transmitted by the user device (PC), the content hey is encrypted by the public key of the user A. The protector 447 includes a content ID which is identification information of the content and a content key ID which is identification information of the content key. The information included in the protector 447 indicates that which content is played back by using the license 440.

The control 444 includes a control code 446 which is usage rules of the content and the like. The control code 446 includes a playback expiration date and the like of the content purchased by the user. The user uses the content within the range of usage rules described in the control code. The control code 446 may also include information indicating for which node the license 440 has been issued.

The user device which acquired the license 440 judges which node the license 440 has been issued for by referring to the control 444. As the result of judgment, when the license has been issued for the user associated with the user device, the user device can play back the content by using the license.

The controller 450 is information which associates the content key 441 with the control 444, including identification information of the content key 441 and identification information of the control 444. In order to discriminate tampering of the content key 441 and the control 444, the controller 450 may include a hash value 453 of the content key 441 and a hash value 454 of the control 444. For example, when transmitted from the license server 3 to the user device and the like, in the case that the content key 441 included in the license 440 is tampered, the hash value found from the content key 441 and the hash value included in the controller will be different values, therefore, it is possible to judge whether the content key 441 has been tampered or not. Also concerning to the control 444, the tampering can be discriminated by the control hash value 454, therefore, it is possible to find rewriting of usage rules of the content and the like when transmitting the license. The license has been explained as the above.

Return to FIG. 13, the license generated in Step S164 is issued with respect to the user device (PC) 6 (3166), and transmitted to the user device (PC) 6 (S168).

The user device (PC) 6 receiving the license in Step S168 decrypts the content key encrypted by the user key of the user who possesses the user device (PC) 6 by using key information (device key) included in the associated information. The content encrypted by the content, key can be played back, in the user device (PC) 6 by decrypting the content by the decrypted content key. Issue of the license has been described as the above.

As described above, the user device 6 reads the license issued by the license server 3 with respect to the content received playback request, and confirms an expiration date and the like based on the usage rules shown in FIG. 5. When the usage rules are valid, the user key (KusrA) of the user A is acquired by the device key (Kdev1), and the content key (Kc) is acquired from the user key (KusrA) to perform decryption of the content, then, the content is played back.

It should be understood by those skilled in the art that various modifications, combinations, sub-combinations and alterations may occur depending on design requirements and other factors insofar as they are within the scope of the appended claims or the equivalents thereof.

What is claimed is:

1. A copyright protection system, comprising:
   a tangible, non-transitory copyright storage medium in which copyright protected contents are recorded;
   an information recording apparatus for recording the copyright protected contents;
   a content server connected to the information recording apparatus for providing the copyright protected contents; and
   a license server handling licenses concerning at least one of recording or playback of the copyright protected contents through a network and providing license data, wherein:
   the licenses include a unique ID for identifying the tangible, non-transitory copyright storage medium in the license server,
   when the information recording apparatus is possessed by a prescribed user who has a license of the copyright protection contents, the information recording apparatus copies the copyright protected contents from the content server and pastes the copyright protected contents into the tangible, non-transitory copyright storage medium,
   when the information recording apparatus is possessed by a user different from the prescribed user, the copyright protected contents are written in the tangible, non-transitory copyright storage medium by combining a domain model which assures playback in the information recording apparatus and a media-bind model, and
   in the media-bind model, the licenses are written in the tangible, non-transitory copyright storage medium in a format in accordance with a protection method of the tangible, non-transitory copyright storage medium and by using secret data or a secret area of the tangible, non-transitory copyright storage medium.

2. The copyright protection system according to claim 1, comprising:
   a content writing area in which copyright protected contents are written; and
   a unique area in which the unique ID is written, wherein the unique area is used for writing the copyright protected contents in the content writing area by combining the domain model and the media-bind model.

3. The copyright protection system according to claim 1, wherein a key unique to the tangible, non-transitory copyright storage medium is written in a unique area.

4. The copyright protection system according to claim 2, wherein the unique ID is set by the license server.

5. An information recording apparatus connected to a content server providing copyright protected contents and a license server handling licenses concerning at least one of recording or playback the copyright protected contents through a network, receiving and recording the copyright protected contents, and providing license data, the information recording apparatus comprising:
   a writing means for writing the copyright protected contents in a tangible, non-transitory copyright protection storage medium, wherein:
   the licenses include a unique ID for identifying the tangible, non-transitory copyright protection storage medium in the license server,
   when a prescribed user who has a license of the copyright protection contents possesses the information recording apparatus, the writing means copies the copyright protected contents from the content server and pastes the copyright protected contents into the tangible, non-transitory copyright protection storage medium,
   when the information recording apparatus is possessed by a user different from the prescribed user, the writing means writes the copyright protected contents in the copyright protection storage medium by combining a domain model which assures playback in the information recording apparatus and a media-bind model, and
   in the media-bind model, the licenses are written in the tangible, non-transitory copyright protection storage medium in a format in accordance with a protection method of the tangible, non-transitory copyright protection storage medium and by using secret data or a secret area of the tangible, non-transitory copyright protection storage medium.

6. The information recording apparatus according to claim 5, wherein the writing means uses the unique ID set to the tangible, non-transitory copyright protection storage medium in order to acquire a user key which encrypts a content key of the copyright protected contents.

7. The information recording apparatus according to claim 5, wherein the writing means uses a unique key set to the tangible, non-transitory copyright protection storage medium in order to acquire a user key which encrypts a content key of the copyright protected contents.

8. The information recording apparatus according to claim 6, wherein the ID which is unique to the tangible, non-transitory copyright protection storage medium is set by the license server.

9. An information recording method executed by an information recording apparatus connected to a content server providing copyright protected contents and a license server handling licenses concerning at least one of recording or playback of the copyright protected contents through a network, receiving and recording the copyright protected contents, and providing license data, the method comprising the steps of:
   writing the copyright protected contents in a tangible, non-transitory copyright protection storage medium, wherein:
   the licenses include a unique ID for identifying the tangible, non-transitory copyright protection storage medium in the license server,
   when a prescribed user who has a license of the copyright protection contents possesses the information recording apparatus, the writing comprises copying the copyright protected contents from the content server and pasting the copyright protected contents into the tangible, non-transitory copyright protection storage medium,
   when the information recording apparatus is possessed by a user different from the prescribed user, the writing comprises writing the copyright protected contents in the tangible, non-transitory copyright protection storage medium by combining a domain model which assures playback in the information recording apparatus and a media-bind model, and
   in the media-bind model, the licenses are written in the tangible, non-transitory copyright protection storage medium in a format in accordance with a protection method of the tangible, non-transitory copyright protection storage medium and by using secret data or a secret area of the tangible, non-transitory copyright protection storage medium.

10. An information playback apparatus playing back copyright protected contents recorded in a tangible, non-transitory copyright protection storage medium, comprising:
  a playback means for playing back the copyright protected contents from the tangible, non-transitory copyright protection storage medium, and
  a license server means for handling licenses concerning at least one of recording or playback of the copyright protected contents through a network, receiving and recording the copyright protected content, and providing license data, wherein:
    the licenses include a unique ID for identifying the tangible, non-transitory copyright protection storage medium in the license server,
    the copyright protected contents are copied from a content server and pasted into the tangible, non-transitory copyright protection storage medium, when a prescribed user having a license of the copyright protected contents possesses the information playback apparatus, and
    the copyright protected contents are written in the tangible, non-transitory copyright protection storage medium by combining a domain model and a media-bind model, when the information playback apparatus is possessed by another user who is different from the prescribed user, and
  in the media-bind model, the licenses are written in the tangible, non-transitory copyright protection storage medium in a format in accordance with a protection method of the tangible, non-transitory copyright protection storage medium and by using secret data or a secret area of the tangible, non-transitory copyright protection storage medium.

11. The information playback apparatus according to claim 10, wherein the playback means uses the ID unique to the tangible, non-transitory copyright protection storage medium in order to acquire a user key which encrypts a content key of the copyright protected contents.

12. The information playback apparatus according to claim 10, wherein the playback means uses a key unique to the tangible, non-transitory copyright protection storage medium in order to acquire a user key which encrypts a content key of the copyright protected contents.

13. The information playback apparatus according to claim 11, wherein the ID which is unique to the tangible, non-transitory copyright protection storage medium is set by the license server connected through a network.

14. An information playback method executed by an information playback apparatus playing back copyright protected contents recorded in a tangible, non-transitory copyright protection storage medium, the method comprising the steps of:
  playing back the copyright protected contents from the copyright protection storage medium, and
  handling licenses concerning at least one of recording or playback of the copyright protected contents through a network, receiving and recording the tangible, non-transitory copyright protected contents, and providing license data, wherein:
    the licenses include a unique ID for identifying the copyright protection storage medium,
    the copyright protected contents are copied from a content server and pasted into the tangible, non-transitory copyright protection storage medium, when a prescribed user who has a license of the copyright protection contents possesses the information playback apparatus,
    the copyright protected contents are written in the tangible, non-transitory copyright protection storage medium by combining a domain model and a media-bind model, when the information playback apparatus is possessed by another user who is different from the prescribed user, and
  in the media-bind model, the licenses are written in the tangible, non-transitory copyright protection storage medium in a format in accordance with a protection method of the tangible, non-transitory copyright protection storage medium and by using secret data or a secret area of the tangible, non-transitory copyright protection storage medium.

15. An information recording apparatus connected to a content server providing copyright protected contents and a license server handling licenses concerning at least one of recording or playback of the copyright protected contents through a network, receiving and recording the copyright protected contents, and providing license data, the apparatus comprising:
  a writing unit writing the copyright protected contents in a tangible, non-transitory copyright protection storage medium, wherein:
    the licenses include a unique ID for identifying the tangible, non-transitory copyright protection storage medium in the license server,
    when a prescribed user who has a license of the copyright protection contents possesses the information recording apparatus, the writing unit copies the copyright protected contents from the content server and pastes the copyright protected contents into the tangible, non-transitory copyright protection storage medium,
    when the information recording apparatus is possessed by a user different from the prescribed user, the writing unit writes the copyright protected contents in the tangible, non-transitory copyright protection storage medium by combining a domain model which assures playback in the information recording apparatus and a media-bind model, and
  wherein in the media-bind model, the licenses are written in the tangible, non-transitory copyright protection storage medium in a format in accordance with a protection method of the tangible, non-transitory copyright protection storage medium and by using secret data or a secret area of the tangible, non-transitory copyright protection storage medium.

16. An information playback apparatus playing back copyright protected contents recorded in a tangible, non-transitory copyright protection storage medium, comprising:
  a playback unit playing back the copyright protected contents from the tangible, non-transitory copyright protection storage medium; and
  a license server unit handling licenses concerning at least one of recording or playback of the copyright protected contents through a network, receiving and recording the copyright protected contents, and providing license data, wherein:
    the licenses include a unique ID for identifying the tangible, non-transitory copyright protection storage medium in the license server,
    the copyright protected contents are copied from a content server and pasted into the tangible, non-transitory copyright protection storage medium, when a prescribed user having a license of the copyright protected contents possesses the information playback apparatus, the copyright protected contents are written in the tangible, non-transitory copyright protection storage medium by combining a domain model and a media-bind model, when the information playback apparatus is possessed by another user who is different from the prescribed user, and wherein in the media-bind model, the licenses are written in the tangible, non-transitory copyright protection storage medium in a format in accordance with a protection method of the tangible, non-transitory copyright protection storage medium and by using secret data or a secret area of the tangible, non-transitory copyright protection storage medium.

17. The copyright protection system according to claim 3, wherein the key is set by the license server.

18. The information recording apparatus according to claim 7, wherein the key which is unique to the tangible, non-transitory copyright protection storage medium is set by the license server.

19. The information playback apparatus according to claim 12, wherein the key which is unique to the tangible, non-transitory copyright protection storage medium is set by the license server connected through a network.

20. The copyright protection system according to claim 1, wherein the license data includes usage rules, which include information selected from at least one of the following:

an expiration date for use until which the copyright protected content can be used based on the license, an expiration date for download until which the copyright protected content can be downloaded based on the license, a number of times the copyright protected content is permitted to be copied based on the license, a number of check-out times, a maximum number of check-out times, a right for recording the copyright protected content in an optical disc based on the license, a number of times the copyright protected content is permitted to be copied in the information recording apparatus, a right which moves the license to an ownership or purchase state, and a duty for taking a use log.

* * * * *